United States Patent
Bando et al.

(10) Patent No.: US 12,162,969 B2
(45) Date of Patent: Dec. 10, 2024

(54) ACRYLIC RUBBER, ACRYLIC RUBBER COMPOSITION, CROSSLINKED ACRYLIC RUBBER, SEAL MATERIAL, AND HOSE MATERIAL

(71) Applicant: ZEON CORPORATION, Tokyo (JP)

(72) Inventors: Fumiaki Bando, Tokyo (JP); Susumu Sato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 747 days.

(21) Appl. No.: 16/975,903

(22) PCT Filed: Mar. 18, 2019

(86) PCT No.: PCT/JP2019/011285
§ 371 (c)(1),
(2) Date: Aug. 26, 2020

(87) PCT Pub. No.: WO2019/188527
PCT Pub. Date: Oct. 3, 2019

(65) Prior Publication Data
US 2021/0009735 A1    Jan. 14, 2021

(30) Foreign Application Priority Data

Mar. 26, 2018 (JP) .................. 2018-057874

(51) Int. Cl.
| | | |
|---|---|---|
| C08F 220/28 | (2006.01) | |
| C08F 220/18 | (2006.01) | |
| C08F 222/02 | (2006.01) | |
| C08F 222/16 | (2006.01) | |
| C08L 33/06 | (2006.01) | |
| C08L 33/10 | (2006.01) | |
| C08F 220/68 | (2006.01) | |

(52) U.S. Cl.
CPC ........ *C08F 220/281* (2020.02); *C08F 220/18* (2013.01); *C08F 220/282* (2020.02); *C08F 222/02* (2013.01); *C08F 222/16* (2013.01); *C08L 33/066* (2013.01); *C08L 33/10* (2013.01); *C08F 220/285* (2020.02); *C08F 220/286* (2020.02); *C08F 220/287* (2020.02); *C08F 220/288* (2020.02); *C08F 220/68* (2013.01); *C08F 222/165* (2020.02); *C08L 33/062* (2013.01); *C08L 2312/00* (2013.01)

(58) Field of Classification Search
CPC .......... C08F 220/28; C08F 220/281; C08F 220/282; C08F 220/285; C08F 220/287; C08F 220/286; C08F 220/288; C08F 220/68; C08F 222/02; C08F 222/16; C08F 222/165; C08L 33/064
See application file for complete search history.

(56) References Cited

U.S. PATENT DOCUMENTS

| | | | | |
|---|---|---|---|---|
| 4,404,327 | A * | 9/1983 | Crugnola | ............... A61L 24/06 |
| | | | | 525/309 |
| 4,731,413 | A * | 3/1988 | Droscher | ............... C08L 67/02 |
| | | | | 525/445 |
| 7,842,754 | B2 * | 11/2010 | Kano | ..................... C08L 33/06 |
| | | | | 525/88 |
| 2008/0051547 | A1 * | 2/2008 | Wakabayashi | ....... C08G 65/336 |
| | | | | 528/18 |
| 2010/0323141 | A1 | 12/2010 | Kawasaki et al. | |
| 2017/0121439 | A1 | 5/2017 | Emori et al. | |
| 2018/0030216 | A1 * | 2/2018 | Emori | ....................... C08J 3/24 |

FOREIGN PATENT DOCUMENTS

| | | | |
|---|---|---|---|
| CN | 106471019 A | 3/2017 | |
| JP | 2000-186251 A | 7/2000 | |
| JP | 2016-027155 A | 2/2016 | |
| WO | 2009/099113 A1 | 8/2009 | |
| WO | WO-2016136697 A1 * | 9/2016 | ............ C08F 220/12 |

OTHER PUBLICATIONS

Mar. 7, 2023 Office Action issued in Japanese Patent Application No. 2020-510712.
Oct. 27, 2021 Chinese Office Action issued in Chinese Patent Application 201980016059.0.
Nov. 12, 2021 Extended European Search Report issued in European Patent Application No. 19774596.1.
May 21, 2019 International Search Report issued in International Patent Application No. PCT/JP2019/011285.
Sep. 6, 2022 Office Action issued in Japanese Patent Application No. 2020-510712.

* cited by examiner

*Primary Examiner* — Ling Siu Choi
*Assistant Examiner* — David L Miller
(74) *Attorney, Agent, or Firm* — Oliff PLC

(57) ABSTRACT

An acrylic rubber containing acrylate monomer units, methacrylate monomer units, and crosslinkable monomer units, wherein a glass transition temperature is −20° C. or less, a change ratio in volume after a crosslinked rubber of the acrylic rubber is immersed in IRM903 oil at 150±2° C. for 72 hours is 0 to 100%, and a change ratio in weight after a crosslinked rubber of the acrylic rubber is immersed in hot water at 150±2° C. for 96 hours and dried is −5.0 to 0%.

12 Claims, No Drawings

ACRYLIC RUBBER, ACRYLIC RUBBER COMPOSITION, CROSSLINKED ACRYLIC RUBBER, SEAL MATERIAL, AND HOSE MATERIAL

FIELD OF THE INVENTION

The present invention relates to acrylic rubbers, acrylic rubber compositions, crosslinked acrylic rubbers, seal materials, and hose materials.

BACKGROUND OF THE INVENTION

An acrylic rubber is widely used for functional parts such as various seal materials and hose materials for mainly automobiles as a rubber material capable of obtaining a crosslinked rubber excellent in oil resistance, heat aging resistance, and cold resistance.

For example, Patent document 1 discloses an acrylic rubber obtained by copolymerizing 10 to 100 parts by mass of an alkyl methacrylate unit and 0.5 to 4 parts by mass of a crosslinkable monomer with respect to 100 parts by mass of an alkyl acrylate.

RELATED-ART DOCUMENT

Patent Documents

Patent document 1: WO 09/099113

SUMMARY OF THE INVENTION

Problems to be Solved by the Invention

However, deterioration of the rubber parts has been of concern in recent years, because the thermal environment around the internal combustion engine has become severe due to high output of the internal combustion engine or measures against exhaust gas, and also because engine oil has been used without being replaced for a long time under high temperature conditions, resulting in deterioration progressing due to contact with heat, air, moisture, and exhaust gas. Therefore, when crosslinked rubber of acrylic rubber is used for seal parts or hose parts of automobiles that contact with engine oil, resistance against deteriorated engine oil (hereinafter referred to as "deteriorated engine oil") is demanded.

The problems to be solved by the present invention are to provide an acrylic rubber capable of obtaining a crosslinked acrylic rubber excellent in heat aging resistance, oil resistance, cold resistance, and deteriorated engine oil resistance.

Means for Solving the Problems

An aspect of the present invention is an acrylic rubber having acrylate monomer units, methacrylate monomer units, and crosslinkable monomer units, wherein a glass transition temperature of the acrylic rubber is −20° C. or less, a change ratio in volume after a crosslinked rubber of the acrylic rubber is immersed in IRM903 oil at 150±2° C. for 72 hours is 0 to 100%, and a change ratio in weight after the crosslinked rubber of the acrylic rubber is immersed in hot water at 150±2° C. for 96 hours and dried is −5.0 to 0%.

EFFECT OF THE INVENTION

According to an aspect of the present invention, the present invention is able to provide an acrylic rubber from which a crosslinked acrylic rubber excellent in heat aging resistance, oil resistance, cold resistance, and deteriorated engine oil resistance can be obtained.

DETAILED DESCRIPTION

The detailed description of the present embodiments is explained hereinafter.

<Acrylic Rubber>

An acrylic rubber of the present invention is an acrylic rubber having acrylate monomer units, methacrylate monomer units, and crosslinkable monomer units, wherein a glass transition temperature of the acrylic rubber is −20° C. or less, a change ratio in volume (hereinafter referred to as a change ratio in volume $\Delta V$) after a crosslinked rubber of the acrylic rubber is immersed in IRM903 oil at 150±2° C. for 72 hours is 0 to 100%, and a change ratio in weight (hereinafter referred to as a change ratio in weight $\Delta W$) after the crosslinked rubber of the acrylic rubber is immersed in hot water at 150±2° C. for 96 hours and dried is −5.0 to 0%.

An acrylate constituting acrylate monomer units contained in the acrylic rubber of the present embodiment is not particularly limited, but examples include alkyl acrylate and alkoxyalkyl acrylate.

The alkyl acrylate is not particularly limited, but esters of alkanols having 1 to 8 carbon atoms with acrylic acid are preferably used. Specifically, examples of the alkyl acrylate include methyl acrylate, ethyl acrylate, n-propyl acrylate, isopropyl acrylate, n-butyl acrylate, isobutyl acrylate, n-hexyl acrylate, 2-ethylhexyl acrylate, cyclohexyl acrylate, and n-octyl acrylate. Among these, methyl acrylate, ethyl acrylate, n-butyl acrylate, 2-ethylhexyl acrylate, and n-octyl acrylate are preferably used, and methyl acrylate, ethyl acrylate, and n-butyl acrylate are more preferably used. These can be used alone or in combination of two or more kinds.

The alkoxyalkyl acrylate is not particularly limited, but esters of alkoxyalkyl alcohol having 2 to 8 carbon atoms with acrylic acid are preferably used. Specifically, examples of the alkoxyalkyl acrylate include methoxymethyl acrylate, ethoxymethyl acrylate, 1-methoxyethyl acrylate, 2-methoxyethyl acrylate, 1-ethoxyethyl acrylate, 2-ethoxyethyl acrylate, 1-propoxyethyl acrylate, 2-propoxyethyl acrylate, 1-butoxyethyl acrylate, 2-butoxyethyl acrylate, 1-methoxypropyl acrylate, 2-methoxypropyl acrylate, 3-methoxypropyl acrylate, 3-ethoxypropyl acrylate, 1-methoxybutyl acrylate, 2-methoxybutyl acrylate, 3-methoxybutyl acrylate, 4-methoxybutyl acrylate, and 4-ethoxybutyl acrylate. Among these, 2-methoxyethyl acrylate is preferably used. These can be used alone or in combination of two or more kinds.

A content of acrylate monomer units is not particularly limited. However, the content of acrylate monomer units is preferably 10.0% by weight or more, more preferably 20.0% by weight or more, furthermore preferably 30.0% by weight or more, particularly preferably 40.0% by weight or more, and also preferably 95.0% by weight or less, more preferably 90.0% by weight or less, furthermore preferably 85.0% by weight or less, and particularly preferably 80.0% by weight or less, based on a total amount of 100% by weight of total monomer units constituting an acrylic rubber. When the content of acrylate monomer units is too low, oil resistance and cold resistance of the resulting crosslinked rubber may be decreased. In contrast, when the content of acrylate monomer units is too high, deteriorated engine oil resistance of the resulting crosslinked rubber may be decreased.

In the present embodiment, the content of alkyl acrylate monomer units is preferably 0% by weight or more, more preferably 5% by weight or more, furthermore preferably 10% by weight or more, particularly preferably 25% by weight or more, most preferably 40% by weight or more, and also preferably 95% by weight or less, more preferably 90% by weight or less, and furthermore preferably 85% by weight or less, based on 100% by weight of the entire monomer units constituting an acrylic rubber.

Also, a content of alkoxyalkyl acrylate is preferably 0% by weight or more and 50% by weight or less, more preferably 0% by weight or more and 40% by weight or less, furthermore preferably 0% by weight or more and 30% by weight or less, and particularly preferably 0% by weight or more and 25% by weight or less based on 100% by weight of the entire monomer units constituting an acrylic rubber. These can be used in combination with each other.

The methacrylate constituting the methacrylate monomer units contained in the acrylic rubber of the present embodiment is not particularly limited. However, examples of methacrylate include alkyl methacrylate, alkoxyalkyl methacrylate, polyalkylene glycol methacrylate, and alkoxy polyalkylene glycol methacrylate. These can be used alone or in combination of two or more kinds.

The alkyl methacrylate is not particularly limited, but esters of alkanols having 1 to 8 carbon atoms with methacrylic acid is preferably used. Specifically, examples of the alkyl methacrylate include methyl methacrylate, ethyl methacrylate, n-propyl methacrylate, isopropyl methacrylate, n-butyl methacrylate, isobutyl methacrylate, n-hexyl methacrylate, 2-ethylhexyl methacrylate, cyclohexyl methacrylate, and n-octyl methacrylate. Among these, methyl methacrylate, ethyl methacrylate, n-propyl methacrylate, and n-butyl methacrylate are preferably used. These can be used alone or in combination of two or more kinds.

The alkoxyalkyl methacrylate is not particularly limited. Examples of the alkoxyalkyl methacrylate include preferably esters of alkoxyalkyl alcohols having 2 to 8 carbon atoms with methacrylic acid, more preferably esters of alkoxyalkyl alcohols having 3 to 6 carbon atoms with methacrylic acid, and furthermore preferably esters of alkoxyalkyl alcohols having 3 to 4 carbon atoms with methacrylic acid. Specifically, examples of the alkoxyalkyl methacrylate include methoxymethyl methacrylate, ethoxymethyl methacrylate, 1-methoxyethyl methacrylate, 2-methoxyethyl methacrylate, 1-ethoxyethyl methacrylate, 2-ethoxyethyl methacrylate, 1-propoxyethyl methacrylate, 2-propoxyethyl methacrylate, 1-butoxyethyl methacrylate, 2-butoxyethyl methacrylate, 1-methoxypropyl methacrylate, 2-methoxypropyl methacrylate, 3-methoxypropyl methacrylate, 4-methoxybutyl methacrylate, 1-methyl-2-methoxyethyl methacrylate, 1-ethyl-2-methoxyethyl methacrylate, and tetrahydrofurfuryl methacrylate. Among these, 2-methoxyethyl methacrylate, 2-ethoxyethyl methacrylate, and 1-methyl-2-methoxyethyl methacrylate are preferably used, and 2-methoxyethyl methacrylate and 2-ethoxyethyl methacrylate are more preferably used.

The polyalkylene glycol methacrylate is not particularly limited. However, esters of polyalkylene glycol having 2 to 30 carbon atoms with methacrylic acid are preferably used. Specifically, examples of the polyalkylene glycol methacrylate include ethylene glycol methacrylate, diethylene glycol methacrylate, triethylene glycol methacrylate, tetraethylene glycol methacrylate, polyethylene glycol methacrylate, propylene glycol methacrylate, dipropylene glycol methacrylate, and polypropylene glycol methacrylate. Among these, diethylene glycol methacrylate and triethylene glycol methacrylate are preferably used. These can be used alone or in combination of two or more kinds.

The alkoxy polyalkylene glycol methacrylate is not particularly limited. However, esters of an alkoxypolyalkylene glycol having 5 to 32 carbon atoms with methacrylic acid is preferably used, esters of an alkoxypolyalkylene glycol having 5 to 11 carbon atoms with methacrylic acid is more preferably used, and esters of alkoxypolyalkylene glycols having 5 to 7 carbon atoms with methacrylic acid are furthermore preferably used. Specifically, examples of the alkoxy polyalkylene glycol methacrylate include methoxydiethylene glycol methacrylate, methoxytriethylene glycol methacrylate, ethoxydiethylene glycol methacrylate, ethoxytriethylene glycol methacrylate, methoxydipropylene glycol methacrylate, methoxytripropylene glycol methacrylate, methoxypolyethylene glycol methacrylate, ethoxypolyethylene glycol methacrylate, methoxypolypropylene glycol methacrylate, and ethoxypolypropylene glycol methacrylate. Among these, methoxydiethylene glycol methacrylate, methoxytriethylene glycol methacrylate, ethoxydiethylene glycol methacrylate, and ethoxytriethylene glycol methacrylate are preferably used, and methoxydiethylene glycol methacrylate and methoxytriethylene glycol methacrylate are more preferably used. These can be used alone or in combination of two or more kinds.

The content of methacrylate monomer units is not particularly limited. However, the content of methacrylate monomer units is preferably 4.9% by weight or more, more preferably 9.9% by weight or more, furthermore preferably 14.9% by weight or more, particularly preferably 17.9% by weight or more, and also preferably 85.0% by weight or less, more preferably 75.0% by weight or less, furthermore preferably 65.0% by weight or less, and particularly preferably 55.0% by weight or less, based on 100% by weight of the entire monomer units constituting an acrylic rubber. When the content of methacrylate monomer units is too low, oil resistance, heat aging resistance, and deteriorated engine oil resistance of the resulting crosslinked rubber may be decreased. In contrast, when the content of methacrylate monomer units is too high, cold resistance of the resulting crosslinked rubber may be decreased.

Also, when the content of acrylate monomer units and methacrylate monomer units is assumed to be 100% by weight of the entire monomer units in the present embodiment, the acrylate monomer units is preferably 10% by weight or more, more preferably 25% by weight or more, furthermore preferably 40% by weight or more, and also preferably 95% by weight or less, more preferably 90% by weight or less, furthermore preferably 85% by weight or less, and of the methacrylate monomer units is preferably 5% by weight or more, more preferably 10% by weight or more, still more preferably 15% by weight or more, and also preferably 85% by weight or less, more preferably 75% by weight or less, and furthermore preferably 65% by weight or less.

The content of alkyl methacrylate monomer units in the present embodiment is preferably 0% by weight or more and 50% by weight or less, more preferably 0% by weight or more and 40% by weight or less, and furthermore preferably 0% by weight or more and 30% by weight or less, based on 100% by weight of the entire monomer units constituting an acrylic rubber.

The content of alkoxyalkyl methacrylate monomer units is preferably 0% by weight or more, more preferably 5% by weight or more, furthermore preferably 10% by weight or more, and also preferably 85.0% by weight or less, more preferably 75% by weight or less, and furthermore preferably 65% by weight or less, based on 100% by weight of the entire monomer units constituting an acrylic rubber.

The content of polyalkylene glycol methacrylate monomer units is preferably 0% by weight or more and 40% by weight or less, more preferably 0% by weight or more and 30% by weight or less, and furthermore preferably 0% by weight or more and 25% by weight or less, based on 100% by weight of the entire monomer units constituting an acrylic rubber.

The content of alkoxypolyalkylene glycol methacrylate monomer units is preferably 0% by weight or more and 50% by weight or less, more preferably 0% by weight or more and 40% by weight or less, and furthermore preferably 0% by weight or more and 30% by weight or less, based on 100% by weight of the entire monomer units constituting an acrylic rubber.

Among these methacrylate monomer units, alkyl methacrylate monomer units may be used in combination with at least one methacrylate monomer unit selected from alkoxyalkyl methacrylate, polyalkylene glycol methacrylate, and alkoxypolyalkylene glycol methacrylate (hereinafter referred to as other methacrylate monomer units). In such a case, the content of the alkyl methacrylate monomer units and other methacrylate monomer units is such that the alkyl methacrylate monomer unit is preferably 0 to 90% by weight and that of the other methacrylate monomer units is 10 to 100% by weight. These may be used in combination.

The crosslinkable monomers constituting the crosslinkable monomer units contained in the acrylic rubber according to the present embodiment is not particularly limited. Examples of the crosslinkable monomers include a carboxyl group, an epoxy group, a halogen group (or a halogen atom), and a diene monomer. A crosslinkable monomer unit is a structural unit derived from a crosslinkable monomer having a crosslinkable group in a side chain.

The monomer having a carboxyl group is not particularly limited, but includes, for example, $\alpha,\beta$-ethylenically unsaturated carboxylic acid monomers.

The $\alpha,\beta$-ethylenically unsaturated carboxylic acid monomer is not particularly limited. Examples of the $\alpha,\beta$-ethylenically unsaturated carboxylic acid monomers include $\alpha,\beta$-ethylenically unsaturated monocarboxylic acid having 3 to 12 carbon atoms, $\alpha,\beta$-ethylenically unsaturated dicarboxylic acid having 4 to 12 carbon atoms, and monoester of $\alpha,\beta$-ethylenically unsaturated dicarboxylic acids having 4 to 12 carbon atoms with alkanols having 1 to 8 carbon atoms. An acrylic rubber can be a carboxyl group-containing acrylic rubber having a carboxyl group as a crosslinking point by using an $\alpha,\beta$-ethylenically unsaturated carboxylic acid monomer. This enables to enhance compression set resistance when the acrylic rubber is used as crosslinked rubber.

Specific examples of the $\alpha,\beta$-ethylenically unsaturated monocarboxylic acids having 3 to 12 carbon atoms include acrylic acid, methacrylic acid, $\alpha$-ethylacrylic acid, crotonic acid, and cinnamic acid.

Specific examples of the $\alpha,\beta$-ethylenically unsaturated dicarboxylic acids having 4 to 12 carbon atoms include butenedioic acid such as fumaric acid and maleic acid; itaconic acid; citraconic acid; and chloromaleic acid.

Specific examples of the monoester of $\alpha,\beta$-ethylenically unsaturated dicarboxylic acid having 4 to 12 carbon atoms and an alkanol having 1 to 8 carbon atoms include butenedioic acid monochain alkyl esters such as monomethyl fumarate, monoethyl fumarate, mono-n-butyl fumarate, monomethyl maleate, monoethyl maleate, and mono-n-butyl maleate; butenedioic acid monoesters having an alicyclic structure such as monocyclopentyl fumarate, monocyclohexyl fumarate, monocyclohexenyl fumarate, monocyclopentyl maleate, monocyclohexyl maleate, and monocyclohexenyl maleate; itaconic acid monoesters such as monomethyl itaconate, monoethyl itaconate, mono-n-butyl itaconate, and monocyclohexyl itaconate.

Among these, monochain alkyl butenedionate or monoester of butenedionate having an alicyclic structure is preferably used; mono-n-butyl fumarate, mono-n-butyl maleate, monocyclohexyl fumarate, and monocyclohexyl maleate are more preferably used; mono-n-butyl maleate, and mono-n-butyl fumarate are furthermore preferably used. These $\alpha,\beta$-ethylenically unsaturated carboxylic acid monomers are used alone or in combination of two or more kinds. In the above-mentioned monomers, the dicarboxylic acids include those existing as anhydrides.

The monomer having an epoxy group is not particularly limited, but the example includes epoxy group-containing (meth)acrylates such as glycidyl (meth)acrylate; epoxy group-containing styrene such as p-vinylbenzyl glycidyl ether; epoxy group-containing ether such as allyl glycidyl ether and vinyl glycidyl ether, 3,4-epoxy-1-pentene, 3,4-epoxy-1-butene, 4,5-epoxy-2-pentene, 4-vinylcyclohexyl glycidyl ether, cyclohexenylmethyl glycidyl ether, 3,4-epoxy-1-vinylcyclohexene and allylphenylglycidyl ether.

In the present specification, "(meth)acrylic acid" means both "acrylic acid" and "methacrylic acid". Therefore, the above-mentioned glycidyl (meth)acrylate indicates glycidyl acrylate and/or glycidyl methacrylate.

The monomer having halogen group is not particularly limited, but the example includes unsaturated alcohol esters of halogen-containing saturated carboxylic acids, haloalkyl (meth)acrylates, haloacyloxyalkyl (meth)acrylates, (haloacetylcarbamoyloxy) alkyl (meth)acrylates, halogen-containing unsaturated ethers, halogen-containing unsaturated ketone, halomethyl group-containing aromatic vinyl compound, halogen-containing unsaturated amide, and haloacetyl group-containing unsaturated monomer.

Specific examples of the unsaturated alcohol ester of a halogen-containing saturated carboxylic acid include vinyl chloroacetate, vinyl 2-chloropropionate, and allyl chloroacetate.

Specific examples of the haloalkyl (meth)acrylates include chloromethyl (meth)acrylate, 1-chloroethyl (meth)acrylate, 2-chloroethyl (meth)acrylate, 1,2-dichloroethyl (meth)acrylate, 2-chloropropyl (meth)acrylate, 3-chloropropyl (meth)acrylate, and 2,3-dichloropropyl (meth)acrylate.

Specific examples of the haloacyloxyalkyl (meth)acrylate include 2-(chloroacetoxy) ethyl (meth)acrylate, 2-(chloroacetoxy) propyl (meth)acrylate, and 3-(chloroacetoxy) propyl (meth)acrylate, and 3-(hydroxychloroacetoxy) propyl (meth)acrylate.

Specific examples of the (meth)acrylic acid (haloacetylcarbamoyloxy) alkyl esters include 2-(chloroacetylcarbamoyloxy) ethyl (meth)acrylate and 3-(chloroacetylcarbamoyloxy) propyl (meth)acrylate.

Specific examples of the halogen-containing unsaturated ether include chloromethyl vinyl ether, 2-chloroethyl vinyl ether, 3-chloropropyl vinyl ether, 2-chloroethyl allyl ether, and 3-chloropropyl allyl ether.

Specific examples of the halogen-containing unsaturated ketone include 2-chloroethyl vinyl ketone, 3-chloropropyl vinyl ketone, and 2-chloroethyl allyl ketone.

Specific examples of the halomethyl group-containing aromatic vinyl compound include p-chloromethylstyrene, m-chloromethylstyrene, o-chloromethylstyrene, and p-chloromethyl-$\alpha$-methylstyrene.

Specific examples of the halogen-containing unsaturated amide include N-chloromethyl (meth)acrylamide.

Specific examples of the haloacetyl group-containing unsaturated monomer include 3-(hydroxychloroacetoxy) propyl allyl ether and p-vinylbenzylchloroacetic acid ester.

The diene monomer is not particularly limited, but, examples of diene monomer include a conjugated diene monomer and a non-conjugated diene monomer. When a diene monomer contains the above-mentioned polyfunctional monomer, a diene monomer is other than the monomer of the components containing in the above-mentioned polyfunctional monomers.

Specific examples of the conjugated diene monomer include 1,3-butadiene, isoprene, and piperylene.

Specific examples of the non-conjugated diene monomer include ethylidene norbornene, dicyclopentadiene, dicyclopentadienyl (meth)acrylate, and 2-dicyclopentadienylethyl (meth)acrylate.

Among the crosslinkable monomers, a monomer unit having a carboxyl group, an epoxy group, and a halogen group is preferably used, and a monomer unit having a carboxyl group is more preferably used. Further, among the monomer units having a carboxyl group, an α,β-ethylenically unsaturated carboxylic acid monomer is preferably used, and monoester of an α,β-ethylenically unsaturated dicarboxylic acid having 4 to 12 carbon atoms with alkanols having 1 to 8 carbon atoms is more preferably used. An acrylic rubber can be a carboxyl group-containing acrylic rubber when α,β-ethylenically unsaturated carboxylic acid monomer is used. This enables to enhance heat aging resistance and compression set resistance while making the deteriorated engine oil resistance good, by the acrylic rubber being an acrylic rubber containing a carboxyl group.

The content of crosslinkable monomer units is preferably 0.1% by weight or more, more preferably 0.5% by weight or more, furthermore preferably 0.6% by weight or more, also preferably 10% by weight or less, more preferably 6% by weight or less, and furthermore preferably 4.0% by weight or less, based on 100% by weight of the entire monomer units constituting an acrylic rubber. When crosslinkable monomer units is less than 0.1% by weight, sufficient mechanical strength cannot be obtained because crosslinking of acrylic rubber cannot be fully proceeded. Also, when an acrylic rubber is excessively crosslinked, elongation of crosslinked product decreases.

The acrylic rubber of the present embodiment may contain other monomer units capable of copolymerizing, in addition to the aforementioned acrylate monomer units, methacrylate monomer units, and crosslinkable monomer units, as long as the acrylic rubber is capable of maintaining the features of acrylic rubber.

Examples of other monomers capable of copolymerizing include olefin-based monomers, aromatic vinyl monomers, α,β-ethylenically unsaturated dicarboxylic acid diester monomers, α,β-ethylenically unsaturated nitrile monomers, vinyl halide compounds, vinyl ether compounds, and vinyl ester compounds.

The olefin-based monomer is not particularly limited. Examples of the olefin-based monomer include ethylene, propylene, 1-butene, 2-butene, 1-hexene, and 1-octene. Among these, ethylene is preferably used.

The aromatic vinyl monomer is not particularly limited. Examples of the aromatic vinyl monomer include styrene, α-methylstyrene, p-dimethylaminostyrene, divinylbenzene, 2-vinylpyridine, and 4-vinylpyridine.

The α,β-ethylenically unsaturated dicarboxylic acid diester monomer is not particularly limited. For examples, the diester of α,β-ethylenically unsaturated dicarboxylic acid having 4 to 12 carbon atoms with alcohols having 1 to 8 carbon atoms is listed. The two organic groups of the diester may be the same or different. Specific examples of the α,β-ethylenically unsaturated dicarboxylic acid diester include maleic diesters such as dimethyl maleate, diethyl maleate, dipropyl maleate, di-n-butyl maleate, diisobutyl maleate, dicyclopentyl maleate, dicyclohexyl maleate, dibenzyl maleate, and diphenyl maleate; fumaric acid diesters such as dimethyl fumarate, diethyl fumarate, dipropyl fumarate, di-n-butyl fumarate, diisobutyl fumarate, dicyclopentyl fumarate, dicyclohexyl fumarate, dibenzyl fumarate, and diphenyl fumarate; citraconic acid diesters such as dimethyl citraconate, diethyl citraconate, dipropyl citraconate, di-n-butyl citraconate, dibenzyl citraconate, and diphenyl citraconate; itaconic acid diesters such as dimethyl itaconate, diethyl itaconate, di-n-butyl itaconate, diisobutyl itaconate, dicyclohexyl itaconate, dibenzyl itaconate, and diphenyl itaconate; mesaconic acid diesters such as dimethylmesaconate, diethyl mesaconate, dipropyl mesaconate, di-n-butyl mesaconate, dibenzyl mesaconate, and diphenyl mesaconate; 2-pentenedionic acid diester such as dimethyl 2-pentenedioate, diethyl 2-pentenedioate, dipropyl 2-pentenedioate, di-n-butyl 2-pentenedioate, dibenzyl 2-pentenedioate, and diphenyl 2-pentenedioate; and dicyclohexyl acetylenedicarboxylate.

The α,β-ethylenically unsaturated nitrile monomer is not particularly limited. Examples of the α,β-ethylenically unsaturated nitrile monomer include acrylonitrile, methacrylonitrile, and vinylidene cyanide.

The vinyl halide compound is not particularly limited. Examples of the vinyl halide compounds include vinyl chloride, vinylidene chloride, and allyl chloride.

The vinyl ether compound is not particularly limited. Examples of the vinyl ether compound include ethyl vinyl ether, dimethylaminoethyl vinyl ether, and n-butyl vinyl ether.

The vinyl ester compound is not particularly limited. Examples of the vinyl ester compound include vinyl acetate, vinyl propionate, vinyl pivalate, vinyl benzoate, and vinyl cinnamate.

In addition to the above, any compounds may be used as desired. Examples of the compounds include monomers (polyfunctional acrylic monomers) having two or more of (meth)acryloyloxy group such as (meth)acrylic acid diester of ethylene glycol, (meth)acrylic acid diester of propylene glycol, 1,4-butanediol di(meth)acrylate, trimethylolpropane tri(meth)acrylate, and pentaerythritol tetra(meth)acrylate; diallyl compounds such as diallyl phthalate and diallyl fumarate; polyfunctional (meth)acrylic monomers such as allyl (meth)acrylate and dicyclopentenyl (meth)acrylate; acrylamide monomers such as (meth)acrylamide, N-hydroxy (meth)acrylamide, N,N-dimethylacrylamide, N,N-diethylacrylamide, and N-isopropyl (meth)acrylamide; (meth)acrylate monomers containing hydroxyl group such as 2-hydroxyethyl (meth)acrylate and 2-hydroxypropyl (meth)acrylate; (meth)acrylate monomers containing nitrogen group such as 2-aminoethyl (meth)acrylate, N-methylaminoethyl (meth acrylate, N,N-dimethylaminoethyl (meth) acrylate, N-ethylaminoethyl (meth)acrylate, and N,N-diethylaminoethyl (meth)acrylate; maleimide, methylmaleimide, ethylmaleimide, phenylmaleimide, vinylimidazole, and N-vinylpyrrolidone.

Among these, ethylene, styrene, dimethyl maleate, diethyl maleate, dipropyl maleate, di-n-butyl maleate, diisobutyl maleate, dimethyl fumarate, diethyl fumarate, dipropyl fumarate, di-n-butyl fumarate, diisobutyl fumarate, dimethyl itaconate, diethyl itaconate, dipropyl itaconate, di-n-butyl itaconate, diisobutyl itaconate, acrylonitrile, vinyl acetate, and vinyl propionate are preferably used, ethylene, diethyl maleate, di-n-butyl maleate, diethyl fumarate, di-n-butyl fumarate, diethyl itaconate, di-n-butyl itaconate, acrylonitrile, and vinyl acetate are more preferably used.

Other monomers capable of copolymerizing are used alone or in combination of two or more kinds. The content of units of other monomers in the acrylic rubber of the present embodiment is 40% by weight or less, preferably 30% by weight or less, more preferably 20% by weight or less, furthermore preferably 12% by weight or less, particularly preferably 5% by weight or less, and most preferably 2% by weight or less.

The glass transition temperature (Tg) of the acrylic rubber of the present embodiment is −20° C. or less, preferably −22° C. or less, and more preferably −25° C. or less. In the specification, the glass transition temperature (Tg) is obtained by measuring the acrylic rubber from −80° C. to 50° C. at a rate of 10° C./min using a differential scanning calorimeter and calculating the glass transition temperature of the acrylic rubber from the peak top of the differential curve. The lower limit of the glass transition temperature (Tg) of the acrylic rubber is not particularly limited, but preferably −80° C. from the viewpoint of measurement limit.

In addition, in the acrylic rubber of the present embodiment, a change ratio in volume $\Delta V$ after the crosslinked rubber of the acrylic rubber immersed in IRM903 oil at 150±2° C. for 72 hours is 0% or more, preferably 10% or more, more preferably 20% or more, furthermore preferably 30% or more, also 100% or less, preferably 90% or less, and more preferably 80% or less.

In the present specification, "a change ratio in volume after the crosslinked rubber of the acrylic rubber immersed in IRM903 oil at 150±2° C. for 72 hours" means a change ratio in volume (%) of a crosslinked rubber of acrylic rubber before and after immersed in a lubricant test oil No. 3 (product name "IRM903", manufactured by Japan Sun Oil Company, Ltd.) at 150±2° C. for 72 hours, in accordance with JIS K6258. The crosslinked rubber of acrylic rubber mentioned here refers to a crosslinked product that is made by crosslinking a composition containing an acrylic rubber and a crosslinking agent (crosslinked rubber which does not contain fillers, or the like that are a compounding agent other than crosslinking agents), and that exhibits features of the acrylic rubber.

In addition, a change ratio in weight $\Delta W$ after a crosslinked rubber of the acrylic rubber is immersed in hot water at 150±2° C. for 96 hours and dried, is −5.0% or above, preferably −4.8% or above, more preferably −4.5% or above, also 0% or below, preferably −0.5% or below, and more preferably −1.0% or below. [0069]

In the present specification, "a change ratio in weight after a crosslinked rubber of an acrylic rubber is immersed in hot water at 150±2° C. for 96 hours and dried" means a change ratio in weight (%) before and after a crosslinked rubber of an acrylic rubber is immersed in distilled hot water at 150±2° C. for 96 hours and dried.

The production method of the acrylic rubber of the present embodiment is not particularly limited, and the acrylic rubber of the present embodiment may be produced by copolymerizing a predetermined monomer according to a known polymerization method. In particular, known methods such as an emulsion polymerization, a suspension polymerization, a solution polymerization, or a bulk polymerization may be employed. Among these, an emulsion polymerization method under normal pressure can be preferably employed from the viewpoint of easiness of controlling of a polymerization reaction.

All types or total amount of the above-mentioned monomers may not be necessary to be supplied for a polymerization from the beginning of the polymerization reaction. The monomers may be continuously or discontinuously added to the reaction over the entire polymerization reaction time by considering copolymerization reactivity rate or reaction conversion rate. Alternatively, the monomers may be introduced at once or separately in the middle or the latter half of the reaction. Also, the ratio of the above-mentioned monomers added in the polymerization reaction is required to be adjusted according to the reactivity of each monomer. However, since the polymerization reaction proceeds almost quantitatively, the ratio of added monomers may be adjusted to the composition of monomer units of desired acrylic rubber.

The acrylic rubber according to the present embodiment thus obtained by crosslinking is capable of providing a crosslinked acrylic rubber excellent in heat aging resistance, oil resistance, cold resistance, and deteriorated engine oil resistance.

<Acrylic Rubber Composition>

The acrylic rubber composition according to the present embodiment contains an acrylic rubber and a crosslinking agent.

The acrylic rubber contained in the acrylic rubber composition of the present embodiment is capable of utilizing the above-mentioned acrylic rubber.

The crosslinking agent used in the present embodiment is not limited as long as the crosslinking agent reacts with structural units derived from a crosslinkable monomer acting as a crosslinking point in the acrylic rubber to constitute a crosslinking structure.

Conventionally known crosslinking agents can be used as crosslinking agents. Examples of the crosslinking agents include polyvalent amine compounds and their carbonates such as diamine compound; polyvalent hydrazide compound; sulfur; sulfur donor; triazinethiol compound; polyvalent epoxy compound; organic ammonium carboxylate; metal dithiocarbamate; polyvalent carboxylic acid; quaternary onium salt; imidazole compound; isocyanuric acid compound; and organic peroxide. These crosslinking agents can be used alone or in combination of two or more kinds. The crosslinking agent can be preferably appropriately selected according to the types of crosslinkable monomer units.

When crosslinkable monomer units constituting the crosslinkable monomer units of the acrylic rubber are crosslinkable monomer units containing a carboxyl group, a crosslinking agent is preferably a polyvalent amine compound and its carbonate, a guanidine compound, a polyvalent hydrazide compound, more preferably a polyvalent amine compound and its carbonate.

The polyvalent amine compound and its carbonate are not particularly limited, but a polyvalent amine compound having 4 to 30 carbon atoms and its carbonate are preferably used. Examples of such polyvalent amine compound and its carbonate include aliphatic polyvalent amine compound and its carbonate, and aromatic polyvalent amine compound and its carbonate.

Among these, the aliphatic polyvalent amine compound and its carbonate are not particularly limited. Examples of the aliphatic polyvalent amine compound and its carbonate include hexamethylenediamine, hexamethylenediamine carbamate, N,N'-dicinnamylidene-1,6-hexanediamine, and carbonates thereof. Among these, hexamethylenediamine carbamate is preferably used.

In addition, the aromatic polyvalent amine compound is not particularly limited. Examples of the aromatic polyvalent amine compounds include 4,4'-methylenedianiline, p-phenylenediamine, m-phenylenediamine, 4,4'-diaminodiphenylether, 3,4'-diaminodiphenylether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4-aminophenoxy)biphenyl, m-xylylenediamine, p-xylylenediamine, and 1,3,5-benzenetriamine. Among these, 2,2'-bis[4-(4-aminophenoxy)phenyl]propane is preferably used.

Furthermore, when a crosslinkable monomer constituting crosslinkable monomer units is a crosslinkable monomer containing an epoxy group, crosslinking agents such as hexamethylene diamine, hexamethylene diamine carbamate, aliphatic polyvalent amine compound and its carbonate; aromatic polyvalent amine compound such as 4,4'-methylene dianiline; ammonium carboxylates such as ammonium benzoate and ammonium adipate; dithiocarbamic acid compounds such as dimethyldithiocarbamic acid and zinc dimethyldithio carbamate; polyvalent carboxylic acids such as tetradecanedioic acid; quaternary onium salts such as cetyltrimethylammonium bromide; imidazole compounds such as 2-methylimidazole; isocyanuric acid compounds such as isocyanuric acid and ammonium isocyanurate can be used. Among these, ammonium benzoate, dimethyldithiocarbamic acid, and isocyanuric acid are preferably used.

Moreover, when a crosslinkable monomer constituting crosslinkable monomer units is a crosslinkable monomer containing a halogen group, crosslinking agents such as triazinethiol derivatives such as trithiocyanuric acid, 1,3,5-triazinetrithiol, 2,4,6-trimercapto-s-triazine, ammonium salt of organic carboxylate such as ammonium adipate or mixture of metallic soap with sulfur, dipentamethylenethiuram hexasulfide, and triethylthiuram disulfide can be used. Among these, 1,3,5-triazinetrithiol, and mixture of metallic soap with sulfur are preferably used.

The content of crosslinking agent in the acrylic rubber composition of the present embodiment is preferably 0.05 parts by weight or more, more preferably 0.1 parts by weight or more, furthermore preferably 0.2 parts by weight or more, also preferably 10 parts by weight or less, and more preferably 5 parts by weight or less, based on 100 parts by weight of the acrylic rubber in the acrylic rubber composition. When the content of crosslinking agent is too low, crosslinking may be insufficient, and it may be difficult to maintain the shape of the crosslinked acrylic rubber. In contrast, when the content of crosslinking agent is too high, the crosslinked acrylic rubber becomes too hard, and it may cause loss of elasticity.

In the acrylic rubber composition of the present embodiment, a crosslinking accelerator in addition to the crosslinking agent can be contained. The crosslinking accelerator is not particularly limited as long as the combination of the crosslinking accelerator and the crosslinking agent promotes crosslinking.

Examples of such crosslinking accelerators include aliphatic monovalent secondary amine compounds, aliphatic monovalent tertiary amine compounds, guanidine compounds such as 1,3-di-o-tolylguanidine, dithiocarbamic acids and their zinc salts such as zinc dibutyldithio carbamate, thiourea compounds such as diethylthiourea, imidazole compounds, quaternary onium salts, tertiary phosphine compounds, alkali metal salts of a weak acid, and diazabicycloalkene compounds. These crosslinking accelerators may be used alone or in combination of two or more kinds.

The use amount of crosslinking accelerator is preferably 0.1 parts by weight or more, more preferably 0.2 parts by weight or more, furthermore preferably 0.5 parts by weight or more, also preferably 10 parts by weight or less, more preferably 7.5 parts by weight or less, and furthermore preferably 5 parts by weight or less, based on 100 parts by weight of the acrylic rubber in the acrylic rubber composition. When the amount of crosslinking accelerator is in excess, crosslinking speed during crosslinking may become too fast, bloom of crosslinking accelerator to the surface of crosslinked product may be caused, or a crosslinked product may become too hard. When the amount of crosslinking accelerator is too small, crosslinking speed may become too slow, and the tensile strength of crosslinked product may extremely be decreased.

In addition, in the acrylic rubber composition of the present embodiment, compounding agents to be generally used in the field of acrylic rubbers can be used such as a crosslinking activator, a filler, a lubricant, an anti-aging agent, a scorch inhibitor, a process oil, and a plasticizer. Each can be blended in requisite amounts in the acrylic rubber composition.

The filler is not particularly limited, but carbon-based materials such as carbon black and graphite can be used. Among these, a carbon black is preferably used. Specific examples of the carbon black include furnace black, acetylene black, thermal black, and channel black. Among these, a furnace black is preferably used. Specific examples of the furnace black include SAF, ISAF, ISAF-HS, ISAF-LS, IISAF-HS, HAF, HAF-HS, HAF-LS, MAF, and FEF. Particularly, FEF, MAF, and HAF-HS are preferably used. Specific examples of the graphite include natural graphite such as vein graphite and flake graphite, and artificial graphite. The above-mentioned carbon-based materials can be used alone or in combination of two or more kinds. The additive amount of filler is preferably 40 to 90 parts by weight based on 100 parts by weight of the acrylic rubber in the acrylic rubber composition.

The filler other than carbon-based material is, for example, metal powders such as aluminum powder, inorganic powders such as hard clay, talc, calcium carbonate, titanium oxide, calcium sulfate, calcium carbonate, aluminum hydroxide; powders such as organic powders such as starch and polystyrene powder; short fibers such as glass fibers (milled fibers), carbon fibers, aramid fibers, and potassium titanate whiskers; and silica, mica. These fillers may be used alone or in combination of two or more kinds.

Examples of the lubricants include hydrocarbon-based wax, fatty acid-based wax, fatty acid amide-based wax, fatty acid ester wax, fatty alcohol-based wax, partial ester-based wax of fatty acid with polyhydric alcohol, silicone oil, polyorganosiloxane, distearyl epoxyhexohydroxy phthalate, sodium alkylsulfate, long-chain aliphatic compound, nonionic ester-based activator, block copolymers of ethylene oxide with propylene oxide, and ethylene tetrafluoride resin powder. These lubricants may be used alone or in combination of two or more kinds.

Examples of anti-aging agents include phenol-based, amine-based, phosphoric-acid-based, and sulfur-based anti-aging agent. The representative example of phenol-based anti-aging agent is 2,2-methylenebis (4-methyl-6-t-butylphenol). The representative example of amine-based anti-aging agent is 4,4'-bis(α,α-dimethylbenzyl)diphenylamine. These anti-aging agents may be used alone or in combination of two or more kinds.

The scorch inhibitor is not particularly limited. Examples of scorch inhibitors include organic acid-based scorch inhibitors such as phthalic anhydride, benzoic acid, salicylic acid, and malic acid; nitroso compound-based scorch inhibitors such as N-nitrosodiphenylamine; thiophthalimide-based scorch inhibitors such as N-(cyclohexylthio) phthalimide; sulfonamide derivative; 2-mercaptobenzimidazole; trichlormelamine; and stearylamine. The scorch inhibitors may be used alone or in combination of two or more kinds.

Also, in the acrylic rubber composition of the present embodiment, rubbers other than the acrylic rubber of the present embodiment, polymers such as elastomer and resin may be added to the acrylic rubber composition, as needed. The content of rubbers other than the acrylic rubber of the present embodiment, polymers such as elastomer and resin are preferably 100 parts by weight or less, more preferably 50 parts by weight or less, furthermore preferably 20 parts by weight or less, based on 100 parts by weight of the acrylic rubber in the acrylic rubber composition.

Examples of rubbers other than acrylic rubber include natural rubber (NR), isoprene rubber (IR), solution polymerized SBR (solution polymerized styrene butadiene rubber), emulsion polymerized SBR (emulsion polymerized styrene butadiene rubber), low cis BR (butadiene rubber), high cis BR, high trans BR (the content of trans bonding in butadiene is 70 to 95%), styrene-isoprene copolymer rubber, butadiene-isoprene copolymer rubber, ethylene propylene diene rubber (EPDM), emulsified polymerized styrene-acrylonitrile-butadiene copolymer rubber, acrylonitrile-butadiene copolymer rubber, polyisoprene-SBR block copolymer rubber, polystyrene-polybutadiene-polystyrene block copolymer, acrylic rubber other than the above-mentioned acrylic rubber, epichlorohydrin rubber, fluorine rubber, silicone rubber, ethylene-propylene rubber, and urethane rubber.

Examples of elastomers include olefin-based elastomers, styrene-based elastomers, polyester-based elastomers, polyamide-based elastomers, polyurethane-based elastomers, and polysiloxane-based elastomers.

Examples of resins include olefin-based resins, styrene-based resins, acrylic-based resins, polyphenylene ether, polyester, polycarbonate, and polyamide.

The method for preparing the acrylic rubber composition of the present embodiment appropriately employs mixing methods such as a roll mixing, a Banbury mixing, a screw mixing, and a solution mixing. The adding order is not particularly limited. However, components not easily reacted or decomposed by heat need to be thoroughly mixed beforehand. Also, components easily reacted or decomposed by heat (such as crosslinking agent or crosslinking accelerator) are needed to be added to the mixture, and mixed for a short period of time at the temperature below the temperature where the components do not react or decompose.

The acrylic rubber composition according to the present embodiment thus obtained is crosslinked to obtain a crosslinked acrylic rubber excellent in heat aging resistance, oil resistance, cold resistance, and deteriorated engine oil resistance.

<Crosslinked Acrylic Rubber>

The crosslinked acrylic rubber of the present embodiment is obtained by crosslinking the above-mentioned acrylic rubber composition.

Crosslinking is carried out by heating the acrylic rubber composition. Regarding the crosslinking conditions, the crosslinking temperature is preferably 130° C. or higher, more preferably 140° C. or higher, preferably 220° C. or lower, and more preferably 200° C. or lower. The crosslinking time is preferably 30 seconds or more, more preferably 1 minute or more, preferably 2 hours or less, and more preferably 1 hour or less. This first stage crosslinking may be referred to as primary crosslinking.

Conventionally known molding methods such as extrusion molding, injection molding, transfer molding, and compression molding can be employed as the molding method for obtaining a crosslinked acrylic rubber having a desired shape. In addition, crosslinking can also be conducted by heating simultaneously with molding.

A general rubber processing procedure can be employed for the extrusion molding. For example, the rubber composition prepared by a roll mixing is supplied to a feed opening of an extruder, then the rubber composition is softened by heat from a barrel on the process of sending the rubber composition to a head portion by a screw. The rubber composition is passed through a die in a predetermined shape provided on the head portion, resulting in obtaining a long-extruded product with desired cross-sectional shape (plates, rods, pipes, hoses, deformed products, etc.).

The production method itself of the extruded product is not particularly limited, and the production method may be employed in accordance with a known production method. Further, the structure of the extruded product is not particularly limited, and examples thereof include a fiber coating, a thread core, and a laminate with another rubber or resin. The extruded product formed into a desired shape is crosslinked. Crosslinking of the extruded product can be obtained by molding into a predetermined shape, followed by primarily crosslinking in a steam can. Also, as needed, secondary crosslinking may be conducted under hot air in an oven.

In an injection molding, a transfer molding, and a compression molding, an acrylic rubber composition of the present embodiment can be filled into a mold cavity having the shape of one product or several products to be shaped. In this case, crosslinking may be conducted after the acrylic rubber composition is molded in advance, or crosslinking may be conducted simultaneously with molding.

The molding temperature is usually 10 to 200° C. or higher, preferably 25° C. or higher, usually 200° C. or lower, and preferably 120° C. or lower. The crosslinking temperature is usually 130° C. or higher, preferably 150° C. or higher, usually 220° C. or lower, and preferably 190° C. or lower. The crosslinking time is usually 2 minutes or more, preferably 3 minutes or more, also usually 10 hours or less, and preferably 5 hours or less. As a heating method, a method used for rubber crosslinking such as press heating, steam heating, oven heating, and hot air heating may be appropriately selected.

In addition, the crosslinked rubber of the present embodiment may be further heated to conduct secondary crosslinking depending on the shape and size of the crosslinked rubber. The secondary crosslinking is preferably carried out for 1 to 48 hours depending on a heat method, a crosslinking temperature, or a shape. A heat method and a heat temperature may be appropriately selected. [0107]

The crosslinked rubber of the present embodiment is excellent in heat aging resistance, oil resistance, cold resistance, and deteriorated engine oil resistance while maintaining basic features of rubbers such as tensile strength, elongation, and hardness. Therefore, taking advantage of these features, the crosslinked rubber of the present embodiment can be suitably used in a variety of fields. For example, in the fields of transporting machines of automobiles, general equipment, and electrical equipment, seal materials such as 0-ring, packing, oil seal, bearing seal, head cover gasket, plug tube gasket, cam journal orifice gasket, cylinder head plug gasket, engine head cover gasket, spool valve gasket, oil pressure sensor gasket, camshaft thrust gasket, oil filter gasket, oil cooler gasket, oil pan gasket, oil filter cartridge gasket, oil pass orifice gasket, oil filter-based gasket, oil level pipe gasket, oil pump gasket, chain case gasket, transmission seal gasket, crankshaft seal gasket, camshaft seal gasket, valve stem seal gasket, baffle plate gasket, valve timing control valve gasket, gallery cap bolt gasket, lower block orifice gasket, power steering seal belt cover seal, positive crankcase ventilation valve gasket and CVJ and R&P boot materials; cushioning materials, vibration damping materials; electric wire coating materials; industrial belts; tubes and houses such as transmission oil cooler hoses, engine oil cooler hoses, turbo intercooler hoses, turbo air duct hoses, power steering hoses, hot air hoses, radiator hoses, power steering hoses, diesel turbocharger hoses, oil-based hoses including high pressure-based for other industrial and construction machines, and tubes and hoses such as fuel-based hoses and drain-based hoses; and sheets are preferably used. Among these, applications for seal materials and hose materials are suitably used.

EXAMPLES

Hereinafter, the details of the present invention are explained by Examples. Note that unless otherwise noted, "parts" and "%" indicate weight bases. However, the present embodiments are not limited to these Examples. Measurements and evaluations of each feature were conducted as the following.
[Conditions of Acrylic Rubber]
<Crosslinked Rubber>
The acrylic rubbers obtained from the following Production Examples 1 to 17 were mixed with 0.6 parts of hexamethylenediamine carbamate (product name "Diak No. 1", manufactured by Du Pont Elastomers Co., Ltd., crosslinking agent) and 2 parts of 1,3-di-o-tolylguanidine (product name "NOCCELER DT", manufactured by OUCHI SHINKO CHEMICAL INDUSTRIAL CO., LTD., crosslinking accelerator, "NOCCELER" is a registered trademark) at 50° C. by a roll mixer, then the mixtures were kneaded to obtain acrylic rubber compositions. The obtained acrylic rubber compositions were inputted into a metal mold of 15 cm in length, 15 cm in width, 0.2 cm in depth, and pressurized at 170° C. for 20 minutes while applying pressure of 10 MPa so that sheet-like crosslinked acrylic rubbers were obtained. Consequently, the obtained sheet-like crosslinked acrylic rubbers were inputted into a gear type oven, and heat-treated at 170° C. for 4 hours.

Also, the acrylic rubbers obtained from the following Production Examples 18 to 21 were mixed with 1.1 parts of ammonium benzoate (product name "VULNOC AB-S", manufactured by OUCHI SHINKO CHEMICAL INDUSTRIAL CO., LTD., crosslinking agent, "VULNOC" is a registered trademark) at 50° C. by a roll mixer, then the mixtures were kneaded to obtain acrylic rubber compositions. The obtained acrylic rubber compositions were inputted into a metal mold of 15 cm in length, 15 cm in width, 0.2 cm in depth, and pressurized at 170° C. for 20 minutes while applying pressure of 10 MPa so that sheet-like crosslinked acrylic rubbers were obtained. Consequently, the obtained sheet-like crosslinked acrylic rubbers were inputted into a gear type oven, and heat-treated at 170° C. for 4 hours.

<Immersion Test in Hot Water>
A test piece having 30 mm in length, 20 mm in width, 2.0±0.2 mm in thickness was prepared by punching out the sheet-like crosslinked acrylic rubber of the above. The test piece was placed in a glass tube having an internal volume of 250 cc, and then 200 cc of distilled water was inputted into the glass tube so that the test piece was fully immersed in the liquid. The glass tube was inputted into an autoclave, followed by inputting into a heating tank, and then the glass tube was heated at 150° C. for 96 hours. After heating, the test piece was taken out and dried by a vacuum dryer at 80° C. for 24 hours. Consequently, the weight of test piece was measured, and a change ratio in weight ΔW (%) was calculated from the obtained measurement results. The change ratio in weight ΔW (%) is a change ratio (%) of the measured value of weight after test piece (measured value after the immersion test in the hot water) was immersed with respect to the measured value of weight before the test piece (measured value of normal physical properties) was immersed in the distilled water.
<Immersion Test in Test Oil>
Oil resistant tests were conducted in accordance with JIS K6258. A test piece prepared in the same manner as the test piece prepared for the immersion test in the hot water of the above was punched out from the obtained sheet-like crosslinked acrylic rubber, so that a test piece having 30 mm in length, 20 mm in width, 2.0±0.2 mm in thickness was prepared. The test piece was placed in a glass tube having an internal volume of 250 cc, and then 200 cc of test liquid was inputted into the glass tube so that the test piece was fully immersed in the liquid. The glass tube was inputted into a heating tank, then the glass tube was heated at 150° C. for 72 hours. In test liquid, lubricant testing oil No. 3 (product name "IRM903", manufactured by Japan Sun Oil Company Ltd.) described in JIS K6258 was used. After heating, the test piece was taken out, and liquid used for the test which remained on the test piece was wiped off, followed by measuring the volume of the test piece. A change ratio in volume ΔV (%) was calculated from the obtained measurement result. The change ratio in volume ΔV (%) is a change ratio (%) of the measured value of the volume after test piece (measured value after the immersion test in the test oil) was immersed with respect to the measured value of the volume before the test piece (measured value of normal physical properties) was immersed in the lubricant testing oil.
<Glass Transition Temperature>
Glass transition temperatures Tg of the acrylic rubbers obtained from the Production Examples were calculated from the peak top of differential curves by measuring the temperatures rising from −80° C. to 50° C. at 10° C./minutes by using a differential scanning calorimeter (DSC, X-DSC7000 manufactured by Hitachi High-Tech Science Corporation).
[Evaluation Method (Confirmation of Effect)]
<Normal Physical Properties (Tensile strength, Elongation, Hardness)>
The acrylic rubber compositions obtained from Examples and Comparative Examples were inputted into a metal mold of 15 cm in length, 15 cm in width, 0.2 cm in depth, and pressurized at 170° C. for 20 minutes while applying pressure of 10 MPa so that sheet-like crosslinked acrylic rubbers were obtained. Consequently, the obtained sheet-like crosslinked acrylic rubbers were inputted into a gear type oven, and heat-treated at 170° C. for 4 hours. Then, the test piece was prepared by cutting out the sheet-like crosslinked acrylic rubber with a JIS No. 3 dumbbell puncher. With use of this test piece, the tensile strength (MPa) and elongation (%) were measured in accordance with JIS K6251. Also, the hardness of the test piece was measured with use of a Durometer hard tester (Type A) in accordance with JIS K6253.

<Heat Aging Resistant Test>

The test piece prepared in the same manner as the test piece used for the evaluation of the above normal physical properties was placed in a gear-type oven at 175° C. for 168 hours, followed by measuring the elongation of the test piece. The obtained result and the normal physical properties measured in accordance with the above method was compared so as to evaluate the heat aging resistance. The elongation was measured in accordance with JIS K 6251, and a change ratio in elongation ΔE (%) in the same manner as the above-mentioned immersion test in the test oil was calculated from the obtained measurement results. The smaller the absolute value of the change ratio in elongation ΔE (%) was, the better the heat aging resistance was.

<Cold Resistant Test>

In the cold resistant test, a low temperature torsion test (Gehman torsion test) was conducted in accordance with JIS K6261. The test piece prepared in the same manner as the test piece used for the evaluation of the above-mentioned normal physical properties was punched out from the obtained sheet-like crosslinked acrylic rubber, so that the test piece having 40.0±2.5 mm in length, 3.0±0.2 mm in width, 2.0±0.2 mm in thickness was prepared. The test was carried out with use of Gehman Stiffness Tester (Toyo Seiki Seisaku-sho, Ltd.), and the temperature so that the relative modulus was 10 (hereinafter referred to as Gehman T10) was determined. The lower values of Gehman T10 were excellent in cold resistance.

<Oil Resistant Test>

Oil resistant test was conducted in accordance with JIS K6258. The test piece prepared in the same manner as the test piece used for the evaluation of the above-mentioned normal physical properties was punched out from the obtained sheet-like crosslinked acrylic rubber, so that the test piece having 30 mm in length, 20 mm in width, 2.0±0.2 mm in thickness was prepared. The test piece was placed in a glass tube having an internal volume of 250 cc, and then 200 cc of the test liquid was inputted into the glass tube so that the test piece was fully immersed in the liquid. The glass tube was inputted into a heating tank, then the glass tube was heated at 150° C. for 72 hours. In the test liquid, lubricant testing oil No. 3 (product name "IRM903", manufactured by Japan Sun Oil Company Ltd.) described in JIS K6258 was used. After heating, the test piece was taken out, and the liquid used for the test left on the test piece was wiped off, followed by measuring the volume of the test piece. A change ratio in volume ΔV (%) was calculated from the obtained measurement result. The change ratio in volume ΔV (%) was a change ratio (%) of the measured value of volume after test piece (measured value after the immersion test in the test oil) was immersed with respect to the measured value of volume before the test piece (measured value of normal physical properties) was immersed in the lubricant testing oil. The smaller of the absolute value of the change ratio in volume ΔV (%) was, the better the oil resistance was.

<Immersion Test in Deteriorated Engine Oil Resistance (A Change in Hardness)>

The test piece prepared in the same manner as the test piece used for the evaluation of the above-mentioned normal physical properties was placed in a glass tube having an internal volume of 250 cc, and then 200 cc of the test liquid was inputted into the glass tube so that the test piece was fully immersed in the liquid. The glass tube was inputted into an autoclave, followed by inputting into a heating tank, then the glass tube was heated at 160° C. for 168 hours. The test liquid (deteriorated engine oil) was prepared by mixing 0.1 g of 95% pure sulfuric acid, 1.2 g of 50% pure nitric acid, 1.0 g of 99.7% pure acetic acid, and 0.04 g of 98% pure formic acid with respect to 197.7 g of engine oil (product name "Mobil10W-40SM/CF", manufactured by Exxon Mobil Corporation, "Mobil" is a registered trademark). The acid concentration in the test liquid was 500 ppm of sulfuric acid, 3000 ppm of nitric acid, 5000 ppm of acetic acid, and 200 ppm of formic acid. After heating, the test piece was taken out, and the liquid used for the test left on the test piece was wiped off, followed by cooling the test piece at a room temperature and measuring the hardness of the test piece. The obtained result and the normal physical properties measured in accordance with the above method were compared so as to evaluate the deteriorated engine oil test. The hardness was measured in accordance with JIS K6253, and the change in hardness was determined from the obtained measurement results. The change in hardness was the difference between the measured value of the hardness of the test piece not immersed in the engine oil (measured value of the normal physical properties) and the measured value of the hardness of the test piece after immersed. The smaller the change in hardness becomes (the difference of the measured hardness), the less the deterioration progresses, resulting in excellence in deteriorated engine oil resistance.

<Immersion Test in Deteriorated Engine Oil Resistance (Determination)>

The test piece which was heated at 180° C. for 168 hours in the same manner as the above immersion test was pulled up and down, or bent to evaluate the deteriorated engine oil resistance of the crosslinked rubber. The evaluation of deteriorated engine oil resistance was based on the following criteria.

A: Any abnormality in crosslinked rubber was not observed when bent at 180°

B: Cracks were observed at the edge of crosslinked rubber when bent at 180°

C.: Crosslinked rubber was broken when bent at 180°

In this test, after the crosslinked rubber was immersed in the test liquid (deteriorated engine oil), crosslinked rubber which maintained rubber elasticity which did not show breakage or cracks was excellent in the deteriorated engine oil resistance. That is, the evaluation indicates excellence in deteriorated engine oil resistance in the order of criteria A, B, and C.

Production Example 1: Acrylic Rubber A 200 parts of water, 3 parts of sodium lauryl sulfate, 78.5 parts of n-butyl acrylate, 20 parts of 2-methoxyethyl methacrylate, and 1.5 parts of mono n-butyl maleate were charged in a polymerization reactor equipped with a thermometer and a stirrer. Oxygen was thoroughly removed twice by deaeration under reduced pressure and substitution of nitrogen. Consequently, 0.005 parts of cumene hydroperoxide and 0.002 parts of sodium formaldehyde sulfoxylate were added, emulsion polymerization was started at a temperature of 30° C. under normal pressure, and the reaction was continued until the polymerization conversion reached 95%. The obtained emulsion polymerization liquid was coagulated with an aqueous calcium chloride solution, washed with water and dried to obtain an acrylic rubber A.

Production Example 2: Acrylic Rubber B

An acrylic rubber B was obtained in the same manner as Production Example 1, except that 68.5 parts of n-butyl acrylate was used and 30 parts of 2-methoxyethyl methacrylate was used.

Production Example 3: Acrylic Rubber C

An acrylic rubber C was obtained in the same manner as Production Example 1, except that 58.5 parts of n-butyl acrylate was used and 40 parts of 2-methoxyethyl methacrylate was used.

Production Example 4: Acrylic Rubber D

An acrylic rubber D was obtained in the same manner as Production Example 1, except that 68.5 parts of n-butyl acrylate was used and 20 parts of 2-methoxyethyl methacrylate was used, and 10 parts of methyl methacrylate was added.

Production Example 5: Acrylic Rubber E

An acrylic rubber E was obtained in the same manner as Production Example 1, except that 68.5 parts of n-butyl acrylate was used, 20 parts of 2-methoxyethyl methacrylate was used, and 10 parts of n-butyl methacrylate was added.

Production Example 6: Acrylic Rubber F

An acrylic rubber F was obtained in the same manner as Production Example 1, except that 68.5 parts of n-butyl acrylate was used, 20 parts of 2-methoxyethyl methacrylate was used, and 10 parts of ethyl methacrylate was added.

Production Example 7: Acrylic Rubber G

An acrylic rubber G was obtained in the same manner as Production Example 1 except that 43.5 parts of n-butyl acrylate was used and 55 parts of 2-ethoxyethyl methacrylate was added instead of 2-methoxyethyl methacrylate.

Production Example 8: Acrylic Rubber H

An acrylic rubber H was obtained in the same manner as Production Example 1, except that 28.5 parts of n-butyl acrylate was used and 70 parts of 2-ethoxyethyl methacrylate was added instead of 2-methoxyethyl methacrylate.

Production Example 9: Acrylic Rubber I

An acrylic rubber I was obtained in the same manner as Production Example 1, except that 20 parts of methoxydiethylene glycol methacrylate was added instead of 2-methoxyethyl methacrylate.

Production Example 10: Acrylic Rubber J

An acrylic rubber J was obtained in the same manner as Production Example 1, except that 20 parts of methoxytriethylene glycol methacrylate was added instead of 2-methoxyethyl methacrylate.

Production Example 11: Acrylic Rubber K 200 parts of water, 3 parts of sodium lauryl sulfate, 68.5 parts of n-butyl acrylate, 20 parts of 2-methoxyethyl methacrylate, and 1.5 parts of mono n-butyl maleate were charged in a pressure-resistant polymerization reactor equipped with a thermometer and a stirrer. Oxygen was thoroughly removed by deaeration under reduced pressure and substitution of nitrogen, twice. Next, ethylene was injected into the reactor under pressure, and the pressure was adjusted to 35 kg/cm$^2$. Consequently, 0.005 parts of cumene hydroperoxide and 0.002 parts of sodium formaldehyde sulfoxylate were added, emulsion polymerization was started at a temperature of 60° C., and the reaction was continued until the polymerization conversion reached 95%. The obtained emulsion polymerization solution was coagulated with an aqueous calcium chloride solution, washed with water and dried to obtain an acrylic rubber K.

Production Example 12: Acrylic Rubber L

An acrylic rubber L was obtained in the same manner as Production Example 1 except that 48.5 parts of n-butyl acrylate was used, 40 parts of 2-methoxyethyl methacrylate was used, 5 parts of 2-methoxyethyl acrylate was used, and 5 parts of ethyl acrylate was added.

Production Example 13: Acrylic Rubber M

An acrylic rubber M was obtained in the same manner as Production Example 1, except that 20 parts of methyl methacrylate was added instead of 2-methoxyethyl methacrylate.

Production Example 14: Acrylic Rubber N 200 parts of water, 3 parts of sodium lauryl sulfate, 65 parts of n-butyl acrylate, 10 parts of methyl methacrylate, 19 parts of 2-methoxyethyl acrylate, 4.5 parts of ethyl acrylate, and 1.5 parts of mono n-butyl maleate were charged in a polymerization reactor equipped with a thermometer and a stirrer. Oxygen was thoroughly removed twice by deaeration under reduced pressure and substitution of nitrogen. Consequently, 0.005 parts of cumene hydroperoxide and 0.002 parts of sodium formaldehyde sulfoxylate were added, emulsion polymerization was started at a temperature of 30° C., and the reaction was continued until the polymerization conversion reached 95%. The obtained emulsion polymerization solution was coagulated with an aqueous calcium chloride solution, washed with water and dried to obtain an acrylic rubber N.

Production Example 15: Acrylic Rubber O

An acrylic rubber O was obtained in the same manner as Production Example 14, except that 18 parts of methyl methacrylate was used and 11 parts of 2-methoxyethyl acrylate was used.

Production Example 16: Acrylic Rubber P

An acrylic rubber P was obtained in the same manner as Production Example 14, except that 77 parts of n-butyl acrylate was used, 17 parts of 2-methoxyethyl acrylate was used, and methyl methacrylate was not used.

Production Example 17: Acrylic Rubber Q

An acrylic rubber Q was obtained in the same manner as Production Example 14, except that 98.5 parts of n-butyl acrylate was used, and methyl methacrylate, 2-methoxyethyl acrylate, and ethyl acrylate were not used.

Production Example 18: Acrylic Rubber R

An acrylic rubber R was obtained in the same manner as Production Example 14 except that 59 parts of n-butyl acrylate was used, 20 parts of methyl methacrylate was used, 20 parts of ethyl acrylate was used, 1.1 parts of allyl glycidyl ether was added instead of mono n-butyl maleate, and 2-methoxyethyl acrylate was not used.

Production Example 19: Acrylic Rubber S

An acrylic rubber S was obtained in the same manner as Production Example 14 except that 71 parts of n-butyl acrylate was used, 28 parts of ethyl methacrylate was used instead of methyl methacrylate, 1.1 parts of allyl glycidyl ether was used instead of mono-n-butyl maleate, and 2-methoxyethyl acrylate and ethyl acrylate were not used.

Production Example 20: Acrylic Rubber T

An acrylic rubber T was obtained in the same manner as Production Example 14 except that 57.3 parts of n-butyl acrylate was used, 41.5 parts of n-butyl methacrylate was used instead of methyl methacrylate, 1.1 parts of allyl glycidyl ether was used instead of mono-n-butyl maleate, and 2-methoxyethyl acrylate and ethyl acrylate were not used.

Production Example 21: Acrylic Rubber U

An acrylic rubber U was obtained in the same manner as Production Example 14 except that 44.5 parts of n-butyl acrylate was used, 54.4 parts of methyl methacrylate was used, 1.1 parts of allyl glycidyl ether was used instead of mono n-butyl maleate, and 2-methoxyethyl acrylate and ethyl acrylate were not used.

<Preparation of Acrylic Rubber Composition>

Example 1

60 parts of HAF carbon black (product name "SEAST 3", manufactured by Tokai Carbon Co., Ltd., filler, "SEAST" is a registered trademark), 1 part of stearic acid (product name "Steatic acid SAKURA", manufactured by NOF Corporation, lubricant), 1 part of ester-based wax (product name "Greg G-8205", manufactured by Dainippon Ink & Chemicals Co., Ltd., lubricant), and 2 parts of 4,4'-bis($\alpha,\alpha$-dimethylbenzyl)diphenylamine (product name "NOCRAC CD", manufactured by OUCHI SHINKO CHEMICAL INDUSTRIAL CO., LTD., anti-aging agent, "NOCRAC" is a registered trademark) were added to 100 parts of acrylic rubber A obtained in Production Example 1. Then, the mixture was mixed by a Banbury mixer at 50° C. for 5 minutes. Next, the resulting mixture was transferred to a roll mixer at 50° C., and 0.5 parts of hexamethylenediamine carbamate (product name "Diak No. 1", manufactured by Du Pont Elastomers Co., Ltd., crosslinking agent) and 1,3-di-o-tolylguanidine (product name "NOCCELER DT", manufactured by OUCHI SHINKO CHEMICAL INDUSTRIAL CO., LTD., crosslinking accelerator, "NOCCELER" is a registered trademark) were mixed and kneaded so as to obtain an acrylic rubber composition. Obtaining a test piece of the crosslinked acrylic rubber produced by the above-mentioned method with use of the resulting acrylic rubber composition, each evaluation such as normal physical properties (tensile strength, elongation, hardness), heat aging resistant test, oil resistant test, cold resistant test, and immersion test in the deteriorated engine oil resistance were carried out. The results are shown in Table 1.

Example 2

An acrylic rubber composition was obtained and evaluated in the same manner as Example 1 except that 100 parts of the acrylic rubber B obtained in Production Example 2 was used instead of the acrylic rubber A obtained in Production Example 1. The results are shown in Table 1.

Example 3

An acrylic rubber composition was obtained and evaluated in the same manner as Example 1 except that 100 parts of the acrylic rubber C obtained in Production Example 3 was used instead of the acrylic rubber A obtained in Production Example 1. The results are shown in Table 1.

Example 4

An acrylic rubber composition was obtained and evaluated in the same manner as Example 1 except that 100 parts of the acrylic rubber D obtained in Production Example 4 was used instead of the acrylic rubber A obtained in Production Example 1. The results are shown in Table 1.

Example 5

An acrylic rubber composition was obtained and evaluated in the same manner as Example 1 except that 100 parts of the acrylic rubber E obtained in Production Example 5 was used instead of the acrylic rubber A obtained in Production Example 1. The results are shown in Table 1.

Example 6

An acrylic rubber composition was obtained and evaluated in the same manner as Example 1 except that 100 parts of the acrylic rubber F obtained in Production Example 6 was used instead of the acrylic rubber A obtained in Production Example 1. The results are shown in Table 1.

Example 7

An acrylic rubber composition was obtained and evaluated in the same manner as Example 1 except that 100 parts of the acrylic rubber G obtained in Production Example 7 was used instead of the acrylic rubber A obtained in Production Example 1. The results are shown in Table 2.

Example 8

An acrylic rubber composition was obtained and evaluated in the same manner as Example 1 except that 100 parts of the acrylic rubber H obtained in Production Example 8 was used instead of the acrylic rubber A obtained in Production Example 1. The results are shown in Table 2.

Example 9

An acrylic rubber composition was obtained and evaluated in the same manner as Example 1 except that 100 parts of the acrylic rubber I obtained in Production Example 9 was used instead of the acrylic rubber A obtained in Production Example 1. The results are shown in Table 2.

Example 10

An acrylic rubber composition was obtained and evaluated in the same manner as Example 1 except that 100 parts of the acrylic rubber J obtained in Production Example 10 was used instead of the acrylic rubber A obtained in Production Example 1. The results are shown in Table 2.

Example 11

An acrylic rubber composition was obtained and evaluated in the same manner as Example 1 except that 100 parts of the acrylic rubber K obtained in Production Example 11 was used instead of the acrylic rubber A obtained in Production Example 1. The results are shown in Table 2.

Example 12

An acrylic rubber composition was obtained and evaluated in the same manner as Example 1 except that 100 parts of the acrylic rubber L obtained in Production Example 12 was used instead of the acrylic rubber A obtained in Production Example 1. The results are shown in Table 2.

Example 13

An acrylic rubber composition was obtained and evaluated in the same manner as Example 1 except that 100 parts of the acrylic rubber M obtained in Production Example 13 was used instead of the acrylic rubber A obtained in Production Example 1. The results are shown in Table 2.

Comparative Example 1

An acrylic rubber composition was obtained and evaluated in the same manner as Example 1 except that 100 parts of the acrylic rubber N obtained in Production Example 14 was used instead of the acrylic rubber A obtained in Production Example 1. The results are shown in Table 3.

Comparative Example 2

An acrylic rubber composition was obtained and evaluated in the same manner as Example 1 except that 100 parts of the acrylic rubber O obtained in Production Example 15 was used instead of the acrylic rubber A obtained in Production Example 1. The results are shown in Table 3.

Comparative Example 3

An acrylic rubber composition was obtained and evaluated in the same manner as Example 1 except that 100 parts of the acrylic rubber P obtained in Production Example 16 was used instead of the acrylic rubber A obtained in Production Example 1. The results are shown in Table 3.

Comparative Example 4

An acrylic rubber composition was obtained and evaluated in the same manner as Example 1 except that 100 parts of the acrylic rubber Q obtained in Production Example 17 was used instead of the acrylic rubber A obtained in Production Example 1. The results are shown in Table 3.

Comparative Example 5

60 parts of HAF carbon black (product name "SEAST 3", manufactured by Tokai Carbon Co., Ltd., filler), 1 part of stearic acid, and 2 parts of 4,4'-bis($\alpha,\alpha$-dimethylbenzyl)diphenylamine(product name "NOCRAC CD", manufactured by OUCHI SHINKO CHEMICAL INDUSTRIAL CO., LTD., anti-aging agent) were added to 100 parts of acrylic rubber R obtained in Production Example 18. The mixture was mixed by a Banbury mixer at 50° C. for 5 minutes. Next, the resulting mixture was transferred to a roll mixer at 50° C., and 1.1 parts of ammonium benzoate (product name "VULNOC AB-S", manufactured by OUCHI SHINKO CHEMICAL INDUSTRIAL CO., LTD., crosslinking agent, "VULNOC" is a registered trademark) was mixed and kneaded so as to obtain an acrylic rubber composition. Obtaining a test piece of the crosslinked acrylic rubber produced by the above-mentioned method with use of the resulting acrylic rubber composition, each evaluation such as normal physical properties (tensile strength, elongation, hardness), heat aging test, oil resistant test, cold resistant test, and immersion test in the deteriorated engine oil resistance were carried out. The results are shown in Table 3.

Comparative Example 6

An acrylic rubber composition was obtained and evaluated in the same manner as Comparative Example 5 except that 100 parts of the acrylic rubber S obtained in Production Example 19 was used instead of the acrylic rubber R obtained in Production Example 18. The results are shown in Table 3.

Comparative Example 7

An acrylic rubber composition was obtained and evaluated in the same manner as Comparative Example 5 except that 100 parts of the acrylic rubber T obtained in Production Example 20 was used instead of the acrylic rubber R obtained in Production Example 18. The results are shown in Table 3.

Comparative Example 8

An acrylic rubber composition was obtained and evaluated in the same manner as Comparative Example 5 except that 100 parts of the acrylic rubber U obtained in Production Example 21 was used instead of the acrylic rubber R obtained in Production Example 18. The results are shown in Table 3.

TABLE 1

|  | Examples | | | | | |
| --- | --- | --- | --- | --- | --- | --- |
|  | 1 | 2 | 3 | 4 | 5 | 6 |
| Acrylic rubber (Rubber composition) | A | B | C | D | E | F |
| 2-methoxyethyl methacrylate | 20 | 30 | 40 | 20 | 20 | 20 |
| 2-ethoxyethyl methacrylate |  |  |  |  |  |  |
| Methoxydiethylene glycol methacrylate |  |  |  |  |  |  |
| Methoxy triethylene glycol methacrylate |  |  |  |  |  |  |
| N-butyl methacrylate |  |  |  |  | 10 |  |
| Methyl methacrylate |  |  |  | 10 |  |  |
| Ethyl methacrylate |  |  |  |  |  | 10 |
| N-butyl acrylate | 78.5 | 68.5 | 58.5 | 68.5 | 68.5 | 68.5 |
| 2-methoxyethyl acrylate |  |  |  |  |  |  |
| Ethyl acrylate |  |  |  |  |  |  |
| Ethylene |  |  |  |  |  |  |
| Mono n-butyl maleate | 1.5 | 1.5 | 1.5 | 1.5 | 1.5 | 1.5 |
| Allyl glycidyl ether |  |  |  |  |  |  |
| Water 150° C. × 96 hrs + dry, Change ratio in weight $\Delta_{W\,(\%)}$ | −3.4 | −2.3 | −1.9 | −2.5 | −1.8 | −2.6 |
| IRM903, 150° C. × 168 hrs, Change ratio in volume $\Delta_{V\,(\%)}$ | 88 | 66 | 49 | 68 | 96 | 88 |
| Glass transition temperature Tg (° C.) | −36 | −30 | −25 | −23 | −31 | −26 |
| Acrylic rubber composition | | | | | | |
| Acrylic rubber | 100 | 100 | 100 | 100 | 100 | 100 |
| HAF carbon black (fillers) | 60 | 60 | 60 | 60 | 60 | 60 |
| Stearic acid | 1 | 1 | 1 | 1 | 1 | 1 |
| Ester-based wax (lubricant) | 1 | 1 | 1 | 1 | 1 | 1 |
| 4,4'-bis(α,α-dimethylbenzyl)diphenylamine (anti-aging agent) | 2 | 2 | 2 | 2 | 2 | 2 |
| Hexamethylenediamine carbamate (crosslinking agent) | 0.5 | 0.5 | 0.5 | 0.5 | 0.5 | 0.5 |
| 1,3-di-o-tolylguanidine (crosslinking accelerator) | 2 | 2 | 2 | 2 | 2 | 2 |
| Ammonium benzoate |  |  |  |  |  |  |
| Normal physical property | | | | | | |
| Tensile strength (MPa) | 9.8 | 10.1 | 10.0 | 11.4 | 9.8 | 10.6 |
| Elongation (%) | 170 | 190 | 220 | 220 | 200 | 210 |
| Hardness (Duro A) | 72 | 74 | 75 | 77 | 76 | 77 |
| Heat aging resistant test (175° C. × 168 hrs) | | | | | | |
| Change ratio in elongation ΔE (%) | 24 | 26 | 30 | 27 | 20 | 25 |
| Oil resistant test (IRM903, 150° C. × 72 hrs) | | | | | | |
| Change ratio in volume ΔV (%) | 53 | 39 | 30 | 40 | 55 | 49 |
| Cold resistant test (Gehman's torsion test) | | | | | | |
| Gehman T10 (%) | −37 | −32 | −28 | −27 | −33 | −28 |
| Immersion test in deteriorated engine oil resistance (160° C. × 168 hrs) | | | | | | |
| Change in hardness | 10 | 5 | 4 | 7 | 8 | 7 |
| Immersion test in deteriorated engine oil resistance (180° C. × 168 hrs) | | | | | | |
| Evaluation | A | A | A | A | A | A |

TABLE 2

|  | Examples | | | | | | |
| --- | --- | --- | --- | --- | --- | --- | --- |
|  | 7 | 8 | 9 | 10 | 11 | 12 | 13 |
| Acrylic rubber (Rubber composition) | G | H | I | J | K | L | M |
| 2-methoxyethyl methacrylate |  |  |  |  | 20 | 40 |  |
| 2-ethoxyethyl methacrylate | 55 | 70 |  |  |  |  |  |
| Methoxydiethylene glycol methacrylate |  |  | 20 |  |  |  |  |
| Methoxy triethylene glycol methacrylate |  |  |  | 20 |  |  |  |
| N-butyl methacrylate |  |  |  |  |  |  |  |
| Methyl methacrylate |  |  |  |  |  |  | 20 |
| Ethyl methacrylate |  |  |  |  |  |  |  |
| N-butyl acrylate | 43.5 | 28.5 | 78.5 | 78.5 | 68.5 | 48.5 | 78.5 |
| 2-methoxyethyl acrylate |  |  |  |  |  | 5 |  |
| Ethyl acrylate |  |  |  |  |  | 5 |  |
| Ethylene |  |  |  |  | 10 |  |  |

TABLE 2-continued

|  | Examples | | | | | | |
| --- | --- | --- | --- | --- | --- | --- | --- |
|  | 7 | 8 | 9 | 10 | 11 | 12 | 13 |
| Mono n-butyl maleate | 1.5 | 1.5 | 1.5 | 1.5 | 1.5 | 1.5 | 1.5 |
| Allyl glycidyl ether | | | | | | | |
| Water 150° C. × 96 hrs + dry, Change ratio in weight $\Delta_{W\,(\%)}$ | −1.9 | −1.5 | −3.8 | −4.1 | −2.1 | −4.3 | −4.1 |
| IRM903, 150° C. × 168 hrs, Change ratio in volume $\Delta_{V\,(\%)}$ | 76 | 65 | 88 | 90 | 98 | 48 | 90 |
| Glass transition temperature Tg (° C.) | −26 | −20 | −38 | −39 | −38 | −24 | −24 |
| Acrylic rubber composition | | | | | | | |
| Acrylic rubber | 100 | 100 | 100 | 100 | 100 | 100 | 100 |
| HAF carbon black (fillers) | 60 | 60 | 60 | 60 | 60 | 60 | 60 |
| Stearic acid | 1 | 1 | 1 | 1 | 1 | 1 | 1 |
| Ester-based wax (lubricant) | 1 | 1 | 1 | 1 | 1 | 1 | 1 |
| 4,4′-bis(α,α-dimethylbenzyl)diphenylamine (anti-aging agent) | 2 | 2 | 2 | 2 | 2 | 2 | 2 |
| Hexamethylenediamine carbamate (crosslinking agent) | 0.5 | 0.5 | 0.5 | 0.5 | 0.5 | 0.5 | 0.5 |
| 1,3-di-o-tolylguanidine (crosslinking accelerator) | 2 | 2 | 2 | 2 | 2 | 2 | 2 |
| Ammonium benzoate | | | | | | | |
| Normal physical property | | | | | | | |
| Tensile strength (MPa) | 9.3 | 9.0 | 9.5 | 9.6 | 10.5 | 10.2 | 10.6 |
| Elongation (%) | 180 | 170 | 180 | 160 | 230 | 210 | 230 |
| Hardness (Duro A) | 75 | 78 | 72 | 72 | 72 | 73 | 76 |
| Heat aging resistant test (175° C. × 168 hrs) | | | | | | | |
| Change ratio in elongation ΔE (%) | 35 | 30 | 5 | 8 | −5 | 15 | 20 |
| Oil resistant test (IRM903, 150° C. × 72 hrs) | | | | | | | |
| Change ratio in volume ΔV (%) | 46 | 40 | 52 | 53 | 55 | 30 | 52 |
| Cold resistant test (Gehman's torsion test) | | | | | | | |
| Gehman T10 (%) | −28 | −23 | −36 | −36 | −35 | −24 | −32 |
| Immersion test in deteriorated engine oil resistance (160° C. × 168 hrs) | | | | | | | |
| Change in hardness | 3 | 2 | 13 | 15 | 12 | 8 | 12 |
| Immersion test in deteriorated engine oil resistance (180° C. × 168 hrs) | | | | | | | |
| Evaluation | A | A | A | A | A | A | A |

TABLE 3

|  | Comparative Examples | | | | | | | |
| --- | --- | --- | --- | --- | --- | --- | --- | --- |
|  | 1 | 2 | 3 | 4 | 5 | 6 | 7 | 8 |
| Acrylic rubber (Rubber composition) | N | O | P | Q | R | S | T | U |
| 2-methoxyethyl methacrylate | | | | | | | | |
| 2-ethoxyethyl methacrylate | | | | | | | | |
| Methoxydiethylene glycol methacrylate | | | | | | | | |
| Methoxy triethylene glycol methacrylate | | | | | | | | |
| N-butyl methacrylate | | | | | | | 41.5 | |
| Methyl methacrylate | 10 | 18 | | | 20 | | | 54.4 |
| Ethyl methacrylate | | | | | | 28 | | |
| N-butyl acrylate | 65 | 65 | 77 | 98.5 | 59 | 71 | 57.3 | 44.5 |
| 2-methoxyethyl acrylate | 19 | 11 | 17 | | | | | |
| Ethyl acrylate | 4.5 | 4.5 | 4.5 | | 20 | | | |
| Ethylene | | | | | | | | |
| Mono n-butyl maleate | 1.5 | 1.5 | 1.5 | 1.5 | | | | |
| Allyl glycidyl ether | | | | | 1.1 | 1.1 | 1.1 | 1.1 |
| Water 150° C. × 96 hrs + dry, Change ratio in weight $\Delta_{W\,(\%)}$ | −7.2 | −5.9 | −7.7 | −7.5 | −5.8 | −3.1 | −2.7 | −2.0 |
| IRM903, 150° C. × 168 hrs, Change ratio in volume $\Delta_{V\,(\%)}$ | 51 | 58 | 85 | 133 | 49 | 111 | 213 | 41 |
| Glass transition temperature Tg (° C.) | −30 | −25 | −43 | −46 | −26 | −28 | −30 | 39 |
| Acrylic rubber composition | | | | | | | | |
| Acrylic rubber | 100 | 100 | 100 | 100 | 100 | 100 | 100 | 100 |
| HAF carbon black (fillers) | 60 | 60 | 60 | 60 | 60 | 60 | 60 | 60 |
| Stearic acid | 1 | 1 | 1 | 1 | 1 | 1 | 1 | 1 |
| Ester-based wax (lubricant) | 1 | 1 | 1 | 1 | | | | |

TABLE 3-continued

|  | Comparative Examples | | | | | | | |
|---|---|---|---|---|---|---|---|---|
|  | 1 | 2 | 3 | 4 | 5 | 6 | 7 | 8 |
| 4,4'-bis(α,α-dimethylbenzyl)diphenylamine (anti-aging agent) | 2 | 2 | 2 | 2 | 2 | 2 | 2 | 2 |
| Hexamethylenediamine carbamate (crosslinking agent) | 0.5 | 0.5 | 0.5 | 0.5 | | | | |
| 1,3-di-o-tolylguanidine (crosslinking accelerator) | 2 | 2 | 2 | 2 | | | | |
| Ammonium benzoate | | | | | 1.1 | 1.1 | 1.1 | 1.1 |
| Normal physical property | | | | | | | | |
| Tensile strength (MPa) | 11.6 | 12.2 | 9.0 | 8.5 | 10.5 | 9.8 | 9.1 | 12.5 |
| Elongation (%) | 190 | 170 | 150 | 160 | 220 | 200 | 170 | 130 |
| Hardness (Duro A) | 71 | 72 | 73 | 72 | 74 | 73 | 74 | 79 |
| Heat aging resistant test (175° C. × 168 hrs) | | | | | | | | |
| Change ratio in elongation ΔE (%) | 21 | 23 | 7 | 21 | −45 | −48 | −40 | −35 |
| Oil resistant test (IRM903, 150° C. × 72 hrs) | | | | | | | | |
| Change ratio in volume ΔV (%) | 33 | 36 | 45 | 70 | 34 | 64 | 94 | 26 |
| Cold resistant test (Gehman's torsion test) | | | | | | | | |
| Gehman T10 (%) | −34 | −29 | −43 | −45 | −25 | −27 | −28 | 15 |
| Immersion test in deteriorated engine oil resistance (160° C. × 168 hrs) | | | | | | | | |
| Change in hardness | 26 | 23 | 34 | 33 | 24 | 13 | 7 | 6 |
| Immersion test in deteriorated engine oil resistance (180° C. × 168 hrs) | | | | | | | | |
| Evaluation | C | C | C | C | C | B | B | C |

As shown in Tables 1 to 3, Examples 1 to 13 showed that absolute values of the change ratio in elongation ΔE (%) in the heat aging resistant test were within 40%; Gehman T10 in the cold resistant test was 10(° C.) or less; absolute values of the change ratio in volume ΔV (%) in the oil resistant test were 60% or less; and the change in hardness in the immersion test in the deteriorated engine oil resistance was evaluated as A.

In contrast, Comparative Examples 1 to 5 showed that the change in hardness in the immersion test in the deteriorated engine oil resistance exceeded 22. Therefore, the immersion test in the deteriorated engine oil resistance was evaluated as C. In addition, Comparative Examples 5 to 7 showed that the absolute value of the change ratio in elongation ΔE (%) in the heat aging resistant test exceeded 35%. Further, Comparative Examples 4, 6, and 7 showed that the absolute value of the change ratio in volume ΔV (%) in the oil resistant test exceeded 60%. Moreover, Comparative Examples 6 and 7 showed that the immersion test in the deteriorated engine oil resistance was evaluated as B. Furthermore, Comparative Example 8 showed that Gehman T10 in the cold resistant test exceeded 10° C. Therefore, the immersion test in the deteriorated engine oil resistance was evaluated as C.

According to these results, the inventors found that the acrylic rubbers of the present embodiment had acrylate monomer units, methacrylate monomer units, and crosslinkable monomer units, wherein the glass transition temperature Tg of the acrylic rubber was −20° C. or less, the change ratio in volume ΔV (%) after a crosslinked rubber of acrylic rubber was immersed in IRM903 oil at 150±2° C. for 72 hours was 0 to 100%; and the change ratio in weight ΔW (%) after the crosslinked rubber of the acrylic rubber was immersed in hot water at 150±2° C. for 96 hours and dried was −0.5 to 0%. Such acrylic rubber of the present embodiments was able to obtain crosslinked acrylic rubbers having excellent heat aging resistance, oil resistance, cold resistance, and deteriorated engine oil resistance while maintaining basic features of rubber such as normal physical properties (tensile strength, elongation, hardness etc.) (Examples 1 to 13).

Hereinafter, the preferable aspects of the present invention are described.

The first aspect is that an acrylic rubber has acrylate monomer units, methacrylate monomer units, and crosslinkable monomer units, wherein the glass transition temperature of the acrylic rubber is −20° C. or less, the change ratio in volume after the crosslinked rubber of acrylic rubber is immersed in IRM903 oil at 150±2° C. for 72 hours is 0 to 100%; and the change ratio in weight after the crosslinked rubber of acrylic rubber is immersed in hot water at 150±2° C. for 96 hours and dried is −5.0 to 0%.

The second aspect is that an acrylic rubber includes an acrylate constituting the acrylate monomer units which is at least one selected from methyl acrylate, ethyl acrylate, n-butyl acrylate, 2-ethylhexyl acrylate, n-octyl acrylate, and 2-methoxyethyl acrylate.

The third aspect is that an acrylic rubber includes a methacrylate constituting the methacrylate monomer units which is at least one selected from alkyl methacrylate, alkoxyalkyl methacrylate, polyalkylene glycol methacrylate, and alkoxy polyalkylene glycol methacrylate.

The fourth aspect is that an acrylic rubber includes a methacrylate constituting the methacrylate monomer units which is at least one selected from methyl methacrylate, ethyl methacrylate, n-propyl methacrylate, n-butyl methacrylate, 2-methoxyethyl methacrylate, 2-ethoxyethyl methacrylate, 1-methyl-2-methoxyethyl methacrylate, diethylene glycol methacrylate, ethylene glycol methacrylate, triethylene glycol methacrylate, methoxydiethylene glycol methacrylate, and methoxytriethylene glycol methacrylate.

The fifth aspect is an acrylic rubber in which the crosslinkable monomer constituting the crosslinkable monomer units is a monomer having a carboxyl group.

The sixth aspect is an acrylic rubber composition containing the above-mentioned acrylic rubber.

The seventh aspect is a crosslinked acrylic rubber formed by crosslinking the above-mentioned acrylic rubber composition.

The eighth aspect is a seal material containing the above-mentioned crosslinked acrylic rubber.

The ninth aspect is a hose material containing the above-mentioned crosslinked acrylic rubber.

Although, aspects of the present invention have been described with reference to examples, the present invention is not limited to specific embodiments and examples, but various modifications and alterations may be made within the scope of the invention according to the appended claims.

The present application is based on and claims priority to Japanese Patent Application No. 2018-057874, filed on Mar. 26, 2018, the entire contents of which are hereby incorporated by reference.

The invention claimed is:

1. An acrylic rubber comprising:
acrylate monomer units;
methacrylate monomer units; and
crosslinkable monomer units;
wherein a glass transition temperature is −20° C. or less, a change ratio in volume after a crosslinked rubber of the acrylic rubber is immersed in IRM903 oil at 150±2° C. for 72 hours is 0 to 100%, and a change ratio in weight after the crosslinked rubber of the acrylic rubber is immersed in hot water at 150±2° C. for 96 hours and dried is-5.0 to 0%,
wherein a content of the acrylate monomer units is 80% by weight or less, based on a total amount of 100% by weight of total monomer units constituting the acrylic rubber,
wherein a content of the methacrylate monomer units is 17.9% by weight or more, based on a total amount of 100% by weight of total monomer units constituting the acrylic rubber, and
wherein none of the crosslinkable monomer units include epoxy groups.

2. The acrylic rubber according to claim 1, wherein an acrylate constituting the acrylate monomer units is at least one selected from methyl acrylate, ethyl acrylate, n-butyl acrylate, 2-ethylhexyl acrylate, n-octyl acrylate, and 2-methoxyethyl acrylate.

3. The acrylic rubber according to claim 1, wherein a methacrylate constituting the methacrylate monomer units is at least one selected from alkyl methacrylate, alkoxyalkyl methacrylate, polyalkylene glycol methacrylate, and alkoxy polyalkylene glycol methacrylate.

4. The acrylic rubber according to claim 1, wherein a methacrylate constituting the methacrylate monomer units is at least one selected from methyl methacrylate, ethyl methacrylate, n-propyl methacrylate, n-butyl methacrylate, 2-methoxyethyl methacrylate, 2-ethoxyethyl methacrylate, 1-methyl-2-methoxyethyl methacrylate, diethylene glycol methacrylate, ethylene glycol methacrylate, triethylene glycol methacrylate, methoxydiethylene glycol methacrylate, and methoxytriethylene glycol methacrylate.

5. The acrylic rubber according to claim 1, wherein a crosslinkable monomer constituting the crosslinkable monomer units is a monomer having a carboxyl group.

6. An acrylic rubber composition comprising the acrylic rubber of claim 1.

7. A crosslinked acrylic rubber, wherein the acrylic rubber composition of claim 6 is crosslinked.

8. A seal material comprising the crosslinked acrylic rubber of claim 7.

9. A hose comprising the crosslinked acrylic rubber of claim 7.

10. The acrylic rubber according to claim 1, wherein the glass transition temperature is −25° C. or less.

11. The acrylic rubber according to claim 1, wherein the change ratio in volume is 30% or more and 80% or less.

12. The acrylic rubber according to claim 1, wherein the change ratio in weight is −4.5 or more and −1.0% or less.

* * * * *